US009588660B2

(12) United States Patent
Matsuo

(10) Patent No.: US 9,588,660 B2
(45) Date of Patent: Mar. 7, 2017

(54) MOBILE ELECTRONIC DEVICE, METHOD FOR CONTROLLING MOBILE ELECTRONIC DEVICE, PROGRAM, AND INFORMATION STORAGE MEDIUM

(75) Inventor: Keisuke Matsuo, Kanagawa (JP)

(73) Assignee: RAKUTEN, INC., Tokyo (JP)

( * ) Notice: Subject to any disclaimer, the term of this patent is extended or adjusted under 35 U.S.C. 154(b) by 411 days.

(21) Appl. No.: 14/241,895

(22) PCT Filed: Apr. 10, 2012

(86) PCT No.: PCT/JP2012/059799

§ 371 (c)(1), (2), (4) Date: Feb. 28, 2014

(87) PCT Pub. No.: WO2013/031281

PCT Pub. Date: Mar. 7, 2013

(65) Prior Publication Data

US 2014/0223370 A1 Aug. 7, 2014

(30) Foreign Application Priority Data

Aug. 31, 2011 (JP) ................................ 2011-190084

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 1/1694* (2013.01); *G06F 3/0488* (2013.01);
(Continued)

(58) Field of Classification Search
None
See application file for complete search history.

(56) References Cited

U.S. PATENT DOCUMENTS

2011/0043453 A1* 2/2011 Roth .................. G06F 3/04886 345/173

FOREIGN PATENT DOCUMENTS

JP 2009-205304 A 9/2009
JP 2011-040035 A 2/2011

OTHER PUBLICATIONS

International Search Report for PCT/JP2012/059799 dated May 22, 2012.

* cited by examiner

*Primary Examiner* — Jeffrey A Gaffin
*Assistant Examiner* — Ayesha Huertas Torres
(74) *Attorney, Agent, or Firm* — Hubbs, Enatsky & Inoue PLLC

(57) ABSTRACT

To provide a mobile electronic device capable of assisting a user so as to readily designate at least a part of a character string displayed on a screen as a selection range. A display unit displays a screen including a character string. A designated position detection unit detects a position in the screen designated by the user. An inclination detection unit detects an inclination of the mobile electronic device. A selection range setting unit sets at least a part of the character string as a selection range. A start position setting unit sets a start position of the selection range, based on the position designated by the user and detected by the designated position detection unit. An end position moving unit moves an end position of the selection range, based on a result of detection by the inclination detection unit, after the start position of the selection range is set.

13 Claims, 8 Drawing Sheets

(51) Int. Cl.
*G06F 3/0488* (2013.01)
*G06F 1/16* (2006.01)
*G06F 17/24* (2006.01)

(52) U.S. Cl.
CPC ......... *G06F 17/24* (2013.01); *H04M 2250/12* (2013.01); *H04M 2250/22* (2013.01); *H04M 2250/70* (2013.01)

| HOLDING STATE | 0 |
|---|---|

FIG. 11

| HOLDING STATE | INCLINATION DIRECTION OF MOBILE ELECTRONIC DEVICE | MOVEMENT DIRECTION INFORMATION OF END POSITION |
|---|---|---|
| 0 | $\alpha$ DIRECTION | UPWARD OR DOWNWARD DIRECTION |
| | $\beta$ DIRECTION | — |
| | $\gamma$ DIRECTION | LEFTWARD OR RIGHTWARD DIRECTION |
| 1 | $\alpha$ DIRECTION | LEFTWARD OR RIGHTWARD DIRECTION |
| | $\beta$ DIRECTION | — |
| | $\gamma$ DIRECTION | UPWARD OR DOWNWARD DIRECTION |

FIG. 12

| INCLINATION DEGREE ($\theta$) | MOVING SPEED INFORMATION OF END POSITION |
|---|---|
| $\theta 1 < \theta \leqq \theta 2$ | V1 |
| $\theta 2 < \theta \leqq \theta 3$ | V2 |
| $\theta 3 < \theta$ | V3 |

MOBILE ELECTRONIC DEVICE, METHOD FOR CONTROLLING MOBILE ELECTRONIC DEVICE, PROGRAM, AND INFORMATION STORAGE MEDIUM

CROSS REFERENCE TO RELATED APPLICATIONS

This application is a National Stage of International Application No. PCT/JP2012/059799 filed Apr. 10, 2012, claiming priority based on Japanese Patent Application No. 2011-190084 filed on Aug. 31, 2011. The contents of each of the above documents are incorporated herein by reference in their entirety.

TECHNICAL FIELD

The present invention relates to a mobile electronic device, a method for controlling a mobile electronic device, a program, and an information storage medium.

BACKGROUND ART

There has been known a mobile electronic device having a detection unit for detecting a position in a screen designated by a user. For example, a mobile electronic device having a touch panel has been known. Conventionally, as a user interface for designating as a selection range at least a part of a character string displayed on a screen of such a mobile electronic device, a user interface on which a user touches the touch panel with a finger to thereby designate the start position and the end position of the selection range has been known (for example, Patent Literature 1).

CITATION LIST

Patent Literature

Patent Literature 1: JP 2009-205304 A

SUMMARY OF INVENTION

Technical Problem

According to the above described user interface, however, the user may not be able to readily recognize which letter is designated as the end position of the selection range as the letter is hidden by the finger. This may resultantly make it difficult for the user to designate a desired letter as the end position of the selection range. That is, the user may not be able to readily designate a desired range as the selection range.

The present invention has been conceived in view of the above, and an object thereof is to provide a mobile electronic device, a method for controlling a mobile electronic device, a program, and an information storage medium capable of assisting a user so as to readily designate at least a part of a character string displayed on a screen as a selection range.

Solution to Problem

In order to achieve the above described objects, a mobile electronic device according to the present invention is a mobile electronic device including display means for displaying a screen including a character string; designated position detection means for detecting a position in the screen designated by a user; inclination detection means for detecting an inclination of the mobile electronic device; and selection range setting means for setting at least apart of the character string as a selection range, wherein the selection range setting means includes start position setting means for setting a start position of the selection range, based on the position designated by the user and detected by the designated position detection means, and end position moving means for moving an end position of the selection range, based on a result of detection by the inclination detection means, after the start position of the selection range is set.

A method for a mobile electronic device according to the present invention is a method for controlling a mobile electronic device including display means for displaying a screen, designated position detection means for detecting a position in the screen designated by a user, and inclination detection means for detecting an inclination of the mobile electronic device, the method including a step of displaying a screen including a character string on the display means; a step of obtaining designated position information on the position designated by the user from the designated position detection means; a step of obtaining inclination information on the inclination of the mobile electronic device from the inclination detection means; and a selection range setting step of setting at least a part of the character string as a selection range, wherein the selection range setting step includes a start position setting step of setting a start position of the selection range, based on the designated position information, and an end position moving step of moving an end position of the selection range, based on the inclination information, after the start position of the selection range is set.

A program according to the present invention is a program for causing a mobile electronic device including display means for displaying a screen, designated position detection means for detecting a position in the screen designated by a user, and inclination detection means for detecting an inclination of the mobile electronic device, to function as display control means for displaying a screen including a character string on the display means; means for obtaining designated position information on the position designated by the user from the designated position detection means; means for obtaining inclination information on the inclination of the mobile electronic device from the inclination detection means; and selection range setting means for setting at least a part of the character string as a selection range, wherein the selection range setting means includes start position setting means for setting a start position of the selection range, based on the designated position information, and an end position moving means for moving an end position of the selection range, based on the inclination information, after the start position of the selection range is set.

An information storage medium according to the present invention is an information storage medium storing a program for causing a mobile electronic device including display means for displaying a screen, designated position detection means for detecting a position in the screen designated by a user, and inclination detection means for detecting an inclination of the mobile electronic device, to function as display control means for displaying a screen including a character string on the display means; means for obtaining designated position information on the position designated by the user from the designated position detection means; means for obtaining inclination information on the inclination of the mobile electronic device from the inclination detection means; and selection range setting means for setting at least a part of the character string as a selection range, wherein the selection range setting means includes start position setting means for setting a start position of the selection range, based on the designated position information, and end position moving means for moving an end position of the selection range, based on the inclination information, after the start position of the selection range is set.

According to one aspect of the present invention, the end position moving means may move the end position in a direction corresponding to a direction of the inclination of the mobile electronic device detected by the inclination detection means.

According to one aspect of the present invention, the end position moving means may set a moving speed of the end position, based on a degree of the inclination of the mobile electronic device detected by the inclination detection means.

According to one aspect of the present invention, the end position moving means may move the end position for every number of letters corresponding to the degree of the inclination of the mobile electronic device detected by the inclination detection means.

According to one aspect of the present invention, the end position moving means may move the end position by a predetermined number of letters at a time interval corresponding to the degree of the inclination of the mobile electronic device.

According to one aspect of the present invention, the end position moving means may include means for determining, in the case where a state of the inclination of the mobile electronic device detected by the inclination detection means is changed from a first state to a second state, and then returned from the second state to a state in which a difference from the first state is within a predetermined range, whether or not a period of time is within a reference period of time, the period of time being taken after the state of the inclination of the mobile electronic device starts changing from the first state to the second state until the state of the inclination returns to the state in which the difference from the first state is within the predetermined range, and means for moving, in the case where it is determined that the period of time is within the reference period of time, the end position by one letter in a direction corresponding to a direction of inclination of the mobile electronic device in the second state relative to the mobile electronic device in the first state.

According to one aspect of the present invention, the end position moving means may include means for determining, in the case where a state of the inclination of the mobile electronic device detected by the inclination detection means is changed from a first state to a second state, and then returned from the second state to a state in which a difference from the first state is within a predetermined range, whether or not a period of time is within a reference period of time, the period of time being taken after the state of the inclination of the mobile electronic device starts changing from the first state to the second state until the state of the inclination returns to the state in which the difference from the first state is within the predetermined range, and means for moving, in the case where it is determined that the period of time is within the reference period of time, the end position by a number of letters corresponding to a degree of inclination of the mobile electronic device in the second state relative to the mobile electronic device in the first state, in a direction corresponding to a direction of inclination of the mobile electronic device in the second state relative to the mobile electronic device in the first state.

According to one aspect of the present invention, the designated position detection means may be a touch panel, the start position setting means may set the start position, based on a position on the touch panel touched by the user, in the case where the touch panel is touched by the user, the end position setting means may keep moving the end position based on the result of detection by the inclination detection means, until touch on the touch panel by the user is released, and in the case where the touch on the touch panel by the user is released, the selection range setting means may confirm as the selection range a range from the start position to the end position at a time at which the touch on the touch panel by the user is released.

Advantageous Effects of Invention

According to the present invention, it is possible to facilitate designation by a user of at least a part of a character string displayed on a screen as a selection range.

BRIEF DESCRIPTION OF DRAWINGS

FIG. 11 shows one example of movement direction data;

FIG. 12 shows one example of moving speed data;

DESCRIPTION OF EMBODIMENTS

In the following, an example of an embodiment of the present invention will be described in detail, based on the drawings.

Figure 1:
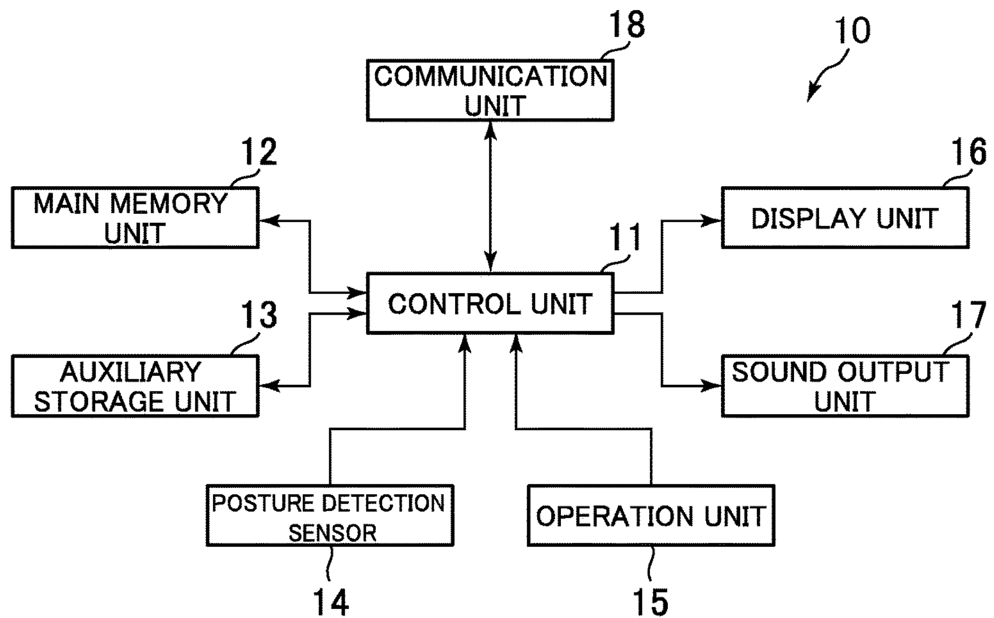
FIG. 1 shows one example of a hardware structure of a mobile electronic device according to an embodiment of the present invention.
Figure 2:
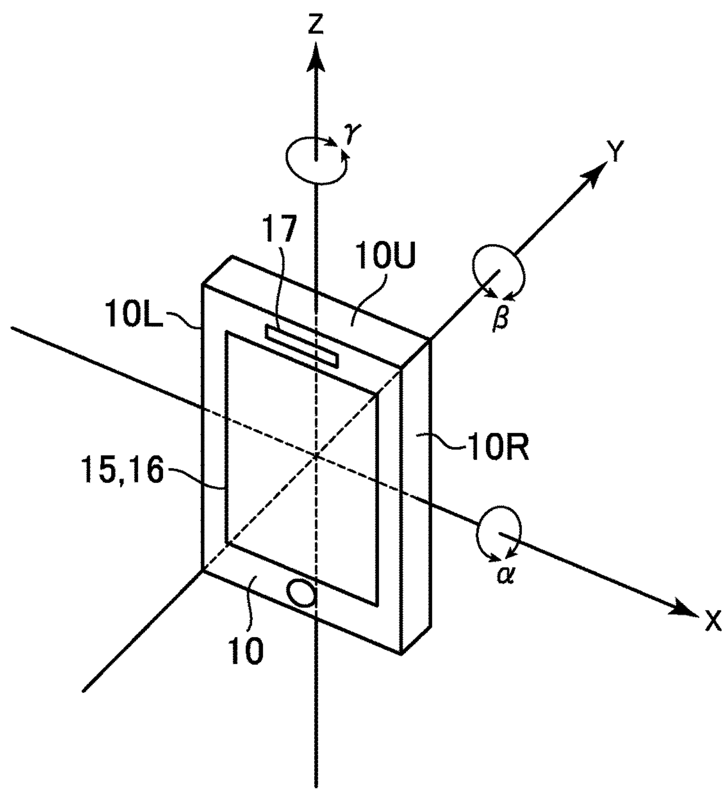
FIG. 2 shows one example of an external appearance of the mobile electronic device according to the embodiment of the present invention.

A mobile electronic device according to this embodiment is implemented using, for example, a portable phone, a portable information terminal, a portable game device, or the like. FIG. 1 shows one example of a hardware structure of a mobile electronic device 10 according to this embodiment. FIG. 2 shows one example of an external appearance of the mobile electronic device 10 according to this embodiment.

As shown in FIG. 1, the mobile electronic device 10 includes a control unit 11, a main memory unit 12, an auxiliary storage unit 13, a posture detection sensor 14, an operation unit 15, a display unit 16, a sound output unit 17, and a communication unit 18. The control unit 11 includes, for example, one or more CPUs and execute information processing according to an operation system or a program stored in the auxiliary storage unit 13. The main memory unit 12 is, for example, a RAM, and the auxiliary storage unit 13 is, for example, a hard disk or a solid state drive.

For example, a program and data are supplied via a communication network, such as the Internet, or the like, to the auxiliary storage unit 13. That is, a program and data sent from a server computer via the communication network is received by the mobile electronic device 10, and stored in the auxiliary storage unit 13. The mobile electronic device 10 may include an optical disk drive for reading a program and data stored in an optical disk (an information storage medium), and the program and data is supplied to the auxiliary storage unit 13 via the optical disk. That is, an optical disk storing a program and data may be mounted in the optical disk drive, and the program and data stored in the optical disk may be read by the optical disk drive and stored in the auxiliary storage unit 13. Alternatively, a structural element for reading a program or data stored in an information storage medium other than an optical disk (for example, a memory card) may be included instead of an optical disk drive, and the program and data may be supplied to the auxiliary storage unit 13 via an information storage medium other than an optical disk.

The posture detection sensor 14 includes one or more sensors for detecting the posture (inclination) of the mobile electronic device 10. For example, the posture detection sensor 14 includes at least one of an acceleration sensor and a gyro sensor. The description below is based on an assumption that an acceleration sensor and a gyro sensor are both built in the mobile electronic device 10.

For example, the acceleration sensor detects acceleration in three respective orthogonal axial directions (the X axial direction, the Y axial direction, and the Z axial direction). As shown in FIG. 2, the mobile electronic device 10 has a rectangular shape, in which the X axis corresponds to the shorter side direction of the mobile electronic device 10, the Z axis corresponds to the longitudinal direction of the mobile electronic device 10, and the Y axis corresponds to the depth direction of the mobile electronic device 10.

For example, the gyro sensor determines an angular speed in three respective orthogonal axes (the X axial direction, the Y axial direction, and the Z axial direction). That is, the gyro sensor detects a rotation amount per unit period of time when the mobile electronic device 10 is rotated with the X axial direction as a rotation axis. That is, the gyro sensor detects an angular speed in the α direction shown in FIG. 2. Similarly, the gyro sensor detects a rotation amount per unit period of time when the mobile electronic device 10 is rotated with the Y axial direction as a rotation axis. That is, the gyro sensor detects an angular speed in the β direction shown in FIG. 2. Further, the gyro sensor detects a rotation amount per unit period of time when the mobile electronic device 10 is rotated with the Z axial direction as a rotation axis. That is, the gyro sensor detects an angular speed in the γ direction shown in FIG. 2.

Information indicating a result of detection by the posture detection sensor 14 is supplied to the control unit 11 for every predetermined period of time (for example, $1/60^{th}$ of a second). The control unit 11 determines the posture (inclination) of the mobile electronic device 10, based on a result of detection by the posture detection sensor 14.

For example, the control unit 11 determines the posture (inclination) of the mobile electronic device 10, based on a result of detection by the acceleration sensor. For example, the control unit 11 determines the posture (inclination) of the mobile electronic device 10, based on how a gravity acceleration is detected as an acceleration in the X axial direction, the Y axial direction, and the Z axial direction, respectively.

Alternatively, for example, the control unit 11 determines the posture (inclination) of the mobile electronic device 10, based on a result of detection by the gyro sensor. For example, the control unit 11 integrates the angular speeds in the respective axes detected by the gyro sensor to thereby determine how much the mobile electronic device 10 is rotated with each axis as a rotation axis.

The operation unit 15 is a unit for operation by a user. In this embodiment, a designation unit on which a user designates a position in a screen displayed on the display unit 16 is provided as the operation unit 15. For example, a pointing device, such as a touch panel or the like, is provided as the operation unit 15. The following description is based on an assumption that a touch panel is provided to the mobile electronic device 10 so as to overlap the display unit 16.

The touch panel provided to the mobile electronic device 10 is a general touch panel, and detects a position touched by a user. As a touch panel, for example, an electrostatic capacitance type touch panel is used. In the electrostatic capacitance type touch panel, one or more positions touched by a user is/are detected based on change in the charge that is caused when the user touches the front surface of the touch panel. Note that another type touch panel, such as resistive film type, or the like, for example, may be used as a touch panel.

Information indicating a position touched by a user is supplied to the control unit 11 for every predetermined period of time (for example, $1/60^{th}$ of a second). A position touched by a user is expressed by means of coordinate values according to a screen coordinate system, for example. A "screen coordinate system" refers to a coordinate system in which the upper left vertex of a screen is defined as the origin O, the rightward direction as the positive direction of the Xs axis, and the downward direction as the positive direction of the Ys axis (see FIG. 3 to be described later). The control unit 11 obtains the position touched by a user, based on the information supplied from the touch panel.

The display unit 16 is a liquid crystal display, or the like, for example, and the sound output unit 17 is a speaker, a headphone terminal, or the like, for example.

The communication unit 18 is a unit for use in data communication by the mobile electronic device 10 with other devices. Specifically, according to an instruction from the control unit 11, the communication unit 18 sends data to another device or supplies data received from another device to the control unit 11. If the mobile electronic device 10 has a telephone function, the communication unit 18 makes a call to another device and receives a call from another device.

Figure 3:
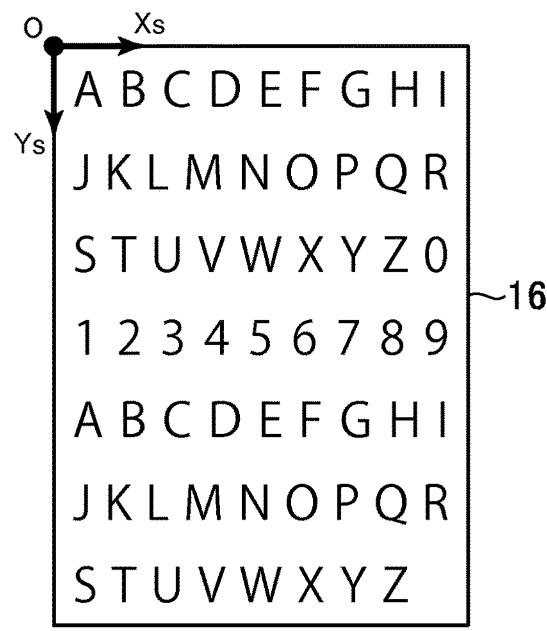
FIG. 3 shows one example of a screen displayed on a display unit.

In the mobile electronic device 10, various application programs are executed. For example, an application program for displaying a character string on the display unit 16 is executed. For example, an application program for referring to text data is executed. FIG. 3 shows one example of a screen displayed on the display unit 16 when the above mentioned application program is executed.

In the above described mobile electronic device 10, a user interface for assisting a user so as to readily designate at least a part of a character string shown in the screen is implemented. Below, this user interface will be described.

Figure 5:
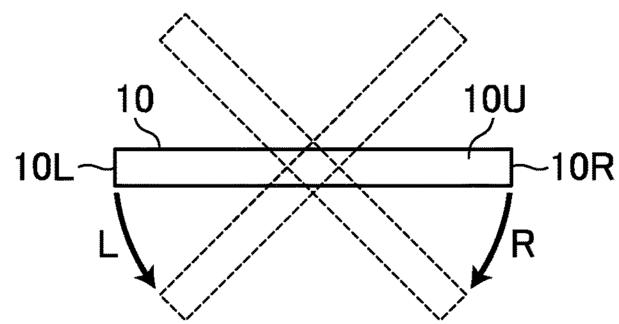
FIG. 5 explains an operation for selecting at least a part of a character string.
Figure 6:
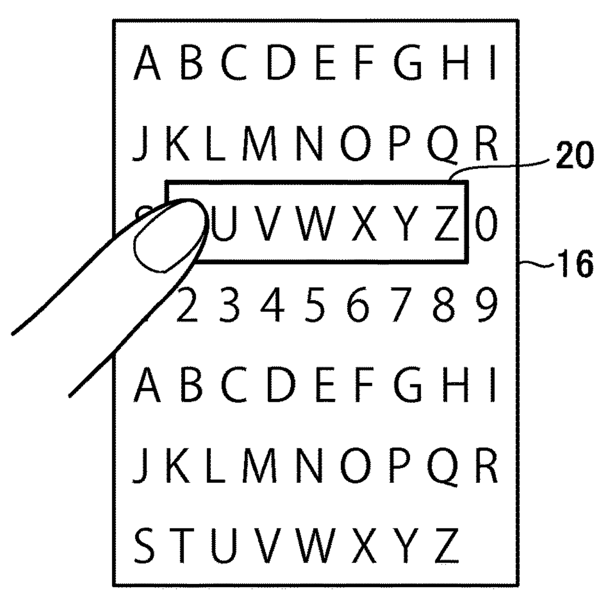
FIG. 6 explains an operation for selecting at least a part of a character string.
Figure 7:
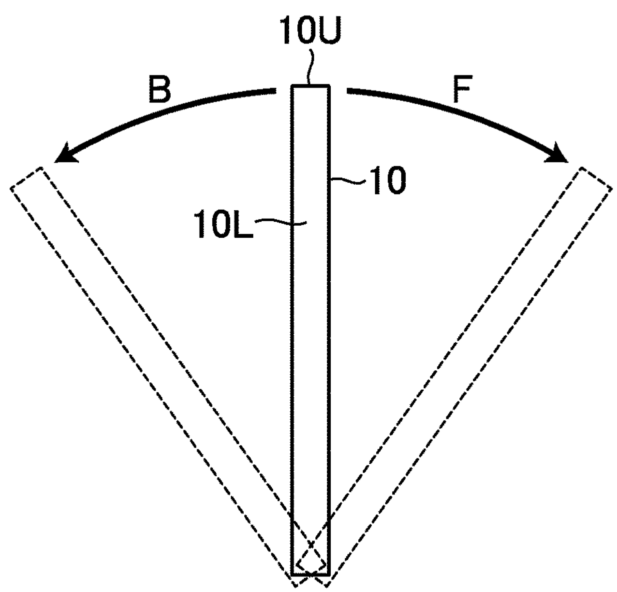
FIG. 7 explains an operation for selecting at least a part of a character string.

Initially, an operation performed by a user in order to designate at least a part of a character string shown in a screen as a selection range will be described. FIGS. 4 to 8 explain this operation. FIG. 5 shows the mobile electronic device 10 viewed from the upper surface 10U side, and FIG. 7 shows the mobile electronic device 10 viewed from the left side surface 10L side.

Figure 4:
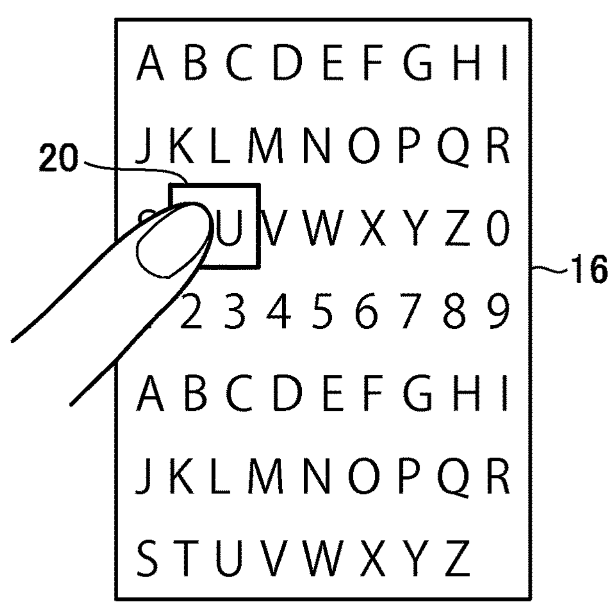
FIG. 4 explains an operation for selecting at least a part of a character string.

As shown in FIG. 4, initially, a user touches a touch panel with a finger to thereby designate the start position of the selection range 20. In the mobile electronic device 10, a letter displayed closest to the position touched by a user is recognized as the start position of the selection range 20. In this case, a letter next to the start position of the selection range 20 is tentatively set as the end position of the selection range 20.

Then, the user changes the inclination of the mobile electronic device 10 while touching the touch panel with the finger, to thereby move the end position of the selection range 20 to a desired position. For example, in order to move rightward the end position of the selection range 20, the user inclines the mobile electronic device 10 as indicated by the arrow L in FIG. 5, for example, such that the left side surface 10L thereof comes closer to the user while the right side surface 10R thereof goes farther away from the user. When the mobile electronic device 10 is inclined as described above, the end position of the selection range 20 is moved rightward, as shown in FIG. 6, for example. When the end position of the selection range 20 reaches the end (the right end) of the line, the end position is shifted to the head (the left end) of the next line.

Meanwhile, in order to move leftward the end position of the selection range 20, the user inclines the mobile electronic device 10 as indicated by the arrow R in FIG. 5, for example, such that the right side surface 10R thereof comes closer to the user while the left side surface 10L thereof goes farther away from the user. When the mobile electronic device 10 is inclined as described above, the end position of the selection range 20 is moved leftward. When the end position of the selection range 20 reaches the head (the left end) of the line, the end position is shifted to the end (the right end) of the immediately preceding line.

Figure 8:
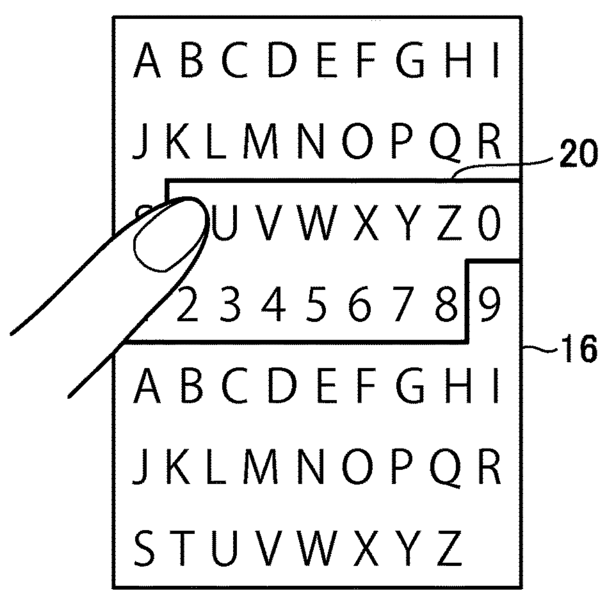
FIG. 8 explains an operation for selecting at least a part of a character string.

In order to move downward the end position of the selection range 20, the user inclines the mobile electronic device 10 forward (closer to the user) as indicated by the arrow F in FIG. 7, for example. When the mobile electronic device 10 is inclined forward, the end position of the selection range 20 is moved downward, as shown in FIG. 8, for example.

Meanwhile, in order to move upward the end position of the selection range 20, the user includes the mobile electronic device 10 backward (goes farther away from the user) as indicated by the arrow B in FIG. 7, for example. When the mobile electronic device 10 is included backward, the end position of the selection range 20 is moved upward.

A moving speed of the end position of the selection range 20 will vary depending on the degree of inclination of the mobile electronic device 10. Specifically, inclination at a larger degree leads to a faster moving speed of the end position.

The user can make fine adjustment of the end position by inclining the mobile electronic device 10 only momentarily (that is, by inclining the mobile electronic device 10 and instantly returning to its original state). That is, when the user performs an operation of inclining the mobile electronic device 10 and instantly returning to its original state within a short period of time (for example, 0.5 second), the end position of the selection range 20 is moved by one letter in the direction corresponding to the inclination direction of the mobile electronic device 10. For example, when the user performs an operation of inclining the mobile electronic device 10, as indicated by the arrow L in FIG. 5, and instantly returning to its original state within a short period of time, the end position of the selection range 20 is moved rightward by one letter. Further, for example, when the user performs an operation of inclining the mobile electronic device 10, as indicated by the arrow F in FIG. 7, and instantly returning to its original state within a short period of time, the end position of the selection range 20 is moved downward by one letter.

Having moved the end position of the selection range 20 to a desired position, the user removes the finger from the touch panel. When the user removes the finger from the touch panel, the selection range 20 is confirmed.

When the selection range 20 is confirmed, a menu showing a plurality of kinds of processing available for the user to select as processing relevant to the character string portion set as the selection range 20 is displayed. For example, the menu showing the plurality of kinds of processing, such as, for example, "copy", "cut (cut out)", "delete", and so forth, is displayed.

When the user selects any of the plurality of kinds of processing, the selected processing is executed. For example, when "copy" is selected, the character string portion set as the selection range 20 is stored in a clip board (the main memory unit 12). When "cut" is selected, for example, the character string portion set as the selection range 20 is stored in the clip board (the main memory unit 12) and further deleted from the screen. When "delete" is selected, for example, the character string portion set as the selection range 20 is deleted from the screen.

As described above, in the mobile electronic device 10, the user can designate the end position of the selection range 20 by inclining the mobile electronic device 10. Meanwhile, in an arrangement in which the user designates the end position of the selection range 20 by touching the touch panel with a finger, the user may not be able to readily recognize which letter is designated as the end position as the letter may be hidden by the finger. According to the mobile electronic device 10, on the contrary, the above described inconvenience is not caused.

Although a case has been described in which the user holds the mobile electronic device 10 such that the longitudinal direction thereof corresponds to the up-down direction (hereinafter referred to a "portrait state"), referring to FIGS. 3 to 8, the user may hold the mobile electronic device 10 such that the longitudinal direction thereof corresponds to the horizontal direction (hereinafter referred to as a "landscape state"). When the user changes the manner of holding the mobile electronic device 10, the orientation of the screen is accordingly changed.

Figures 9, 10:
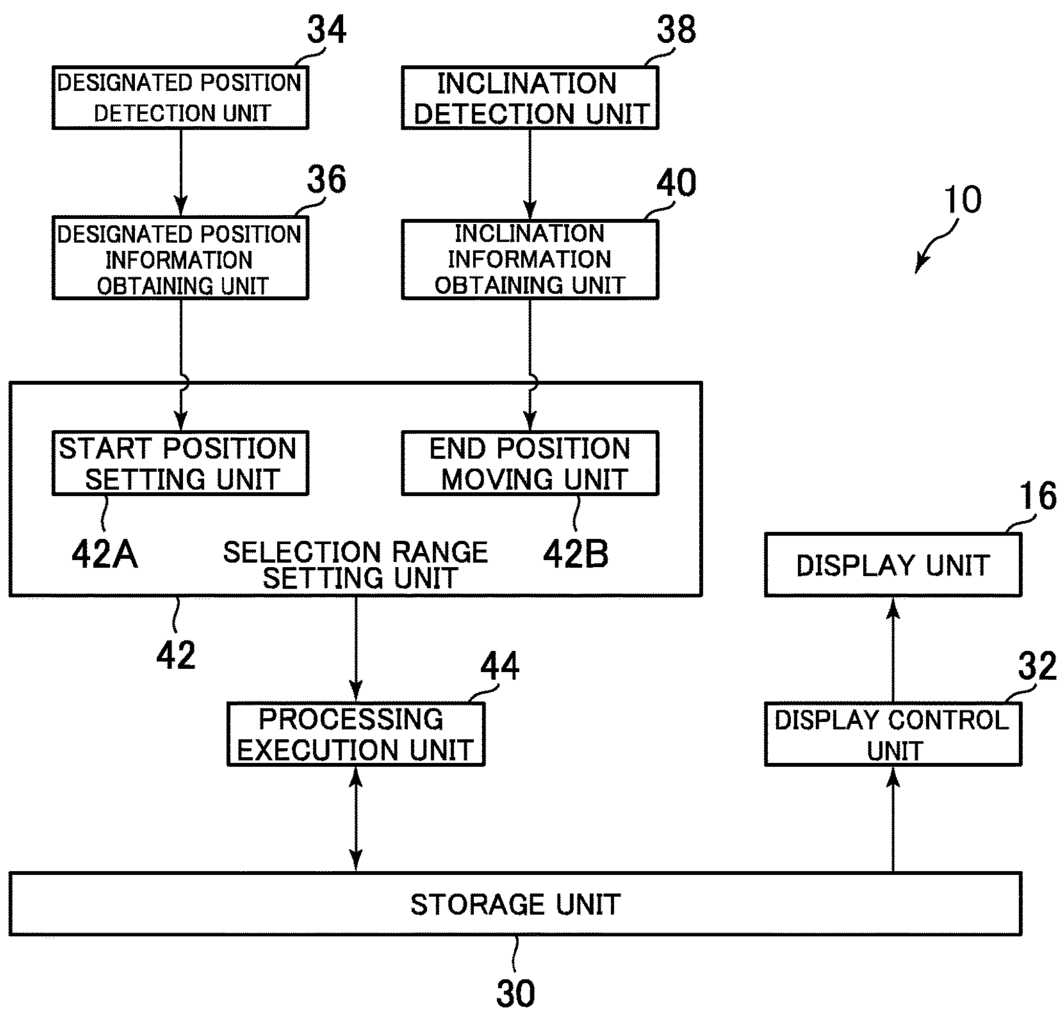
FIG. 9 is a function block diagram of the mobile electronic device according to the embodiment of the present invention.
FIG. 10 shows one example of holding state data.

Below, a structure for implementing the above described user interface will be described. FIG. 9 is a function block diagram showing function blocks relevant to the present invention among those implemented in the mobile electronic device 10 according to this embodiment. As shown in FIG. 9, the mobile electronic device includes a storage unit 30, a display control unit 32, a designated position detection unit 34, a designated position information obtaining unit 36, an inclination detection unit 38, an inclination information obtaining unit 40, a selection range setting unit 42, and a processing execution unit 44.

For example, the storage unit 30 is the main memory unit 12 and the auxiliary storage unit 13. For example, the designated position detection unit 34 is a detection unit (a touch panel) on which a user designates a position in a screen. The inclination detection unit 38 is the posture detection sensor 14. The other function blocks are implemented by the control unit 11. That is, the control unit 11 executes processing according to a program, thereby functioning as the other function blocks.

Initially, the storage unit 30 will be described. Various data is stored in the storage unit 30. For example, text data to be displayed on the display unit 16 is stored in the storage unit 30. Further, for example, when an operation for setting the selection range 20 is performed (that is, when a screen such as is shown in FIGS. 4, 6, 8 is displayed), data indicating the start position and the end position of the selection range 20 is stored in the storage unit 30.

Further, holding state data, such as is shown in FIG. 10, for example, is stored in the storage unit 30. The holding state data shown in FIG. 10 is data indicating in which of the portrait state and the landscape state the user is holding the mobile electronic device 10. For example, the holding state data takes a value either “0” or “1”. The value “0” indicates that the user is holding the mobile electronic device 10 in the portrait state; the value “1” indicates that the user is holding the mobile electronic device 10 in the landscape state. For example, the holding state data is updated by the operating system, based on a result of detection by the posture detection sensor 14.

The display control unit 32 will be described. The display control unit 32 displays a screen including a character string on the display unit 16.

The designated position detection unit 34 and the designated position information obtaining unit 36 will be described. The designated position detection unit 34 detects a position in the screen designated by the user. As described above, the touch panel corresponds to the designated position detection unit 34 in this embodiment, and the designated position detection unit 34 detects a position on the touch panel touched by the user. The designated position information obtaining unit 36 obtains designated position information concerning the position in the screen designated by the user from the designated position detection unit 34.

The inclination detection unit 38 and the inclination information obtaining unit 40 will be described. The inclination detection unit 38 detects the inclination of the mobile electronic device 10. As described above, the posture detection sensor 14 corresponds to the inclination detection unit 38 in this embodiment. The inclination information obtaining unit 40 obtains inclination information concerning inclination of the mobile electronic device 10 from the inclination detection unit 38.

The selection range setting unit 42 will be described. The selection range setting unit 42 sets at least a part of a character string shown in a screen as the selection range 20. The selection range setting unit 42 includes a start position setting unit 42A and an end position moving unit 42B.

The start position setting unit 42A sets the start position of the selection range 20, based on the position designated by the user that is detected by the designated position detection unit 34. In this embodiment, the start position setting unit 42A sets the start position, based on the position on the touch panel touched by the user.

After setting the start position of the selection range 20, the end position moving unit 42B moves the end position of the selection range 20, based on a result of detection by the inclination detection unit 38. In this embodiment, when the touch panel is touched by the user, the end position moving unit 42B keeps moving the end position, based on a result of detection by the inclination detection unit 38, until touch on the touch panel by the user is released.

The end position moving unit 42B moves the end position, based on the inclination direction and the inclination degree of the mobile electronic device 10, as to be described below.

Note here that the “inclination direction of the mobile electronic device 10” refers to the inclination direction of the current posture of the mobile electronic device 10 relative to the reference posture of the mobile electronic device 10. That is, the “inclination direction of the mobile electronic device 10” means in which direction the current posture of the mobile electronic device 10 is inclined relative to the reference posture.

Further, the “inclination degree of the mobile electronic device 10” refers to the degree of inclination of the current posture of the mobile electronic device 10 relative to the reference posture of the mobile electronic device 10. That is, the “inclination degree of the mobile electronic device 10” refers to by what degree the current posture of the mobile electronic device 10 is inclined relative to the reference posture.

Note that a “reference posture” refers to the posture of the mobile electronic device 10 at a certain moment (at a reference point of time). The “reference point of time” refers to, for example, a point of time at which a touch panel is touched by a user or the start position of the selection range 20 is set. The “reference point of time” may be a point of time at which the mobile electronic device 10 is activated or an application program is activated. Alternatively, when the mobile electronic device 10 is kept in the same posture for a predetermined period of time, the posture at that time may be set as a “reference posture”. Note that, in this case, when a situation in which variation in the posture (inclination) of the mobile electronic device 10 remains within a predetermined range lasts for a predetermined period of time, the mobile electronic device 10 may be considered being kept in the same posture for a predetermined period of time.

For example, the end position moving unit 42B moves the end position in the direction corresponding to the inclination direction of the mobile electronic device 10 detected by the inclination detection unit 38.

In order to move the end position of the selection range 20 in the direction correlated to the inclination direction of the mobile electronic device 10, information concerning a correlation relationship between the inclination direction of the mobile electronic device 10 and movement direction information of the end position is necessary. Data describing the correlation relationship will be hereinafter referred to as “movement direction data”.

FIG. 11 shows one example of the movement direction data. In the movement direction data shown in FIG. 11, a correlation relationship between the inclination direction of the mobile electronic device 10 and the movement direction of the end position is defined with respect to each of the holding states (portrait state or landscape state) of the mobile electronic device 10.

According to the movement direction data shown in FIG. 11, inclination in the α direction (the arrows F, B in FIG. 7) with the mobile electronic device 10 held in the portrait state (the case shown in FIGS. 2, 5, 7) is correlated to up-down movement of the end position. Note here assuming that rotation (inclination) in the clockwise direction with the X axis as a rotation axis is referred to as “inclination in the positive direction”, and rotation (inclination) in the counterclockwise direction with the X axis as a rotation axis is referred to as “inclination in the negative direction”, inclination in the negative direction of the α direction (the arrow B in FIG. 7) is correlated to upward movement of the end position, and inclination in the positive direction of the α direction (the arrow F in FIG. 7) is correlated to downward movement of the end position.

Further, according to the movement direction data shown in FIG. 11, inclination in the γ direction with the mobile electronic device 10 held in the landscape state is correlated to up-down movement of the end position. Note here assuming that rotation (inclination) in the clockwise direction with the Z axis as a rotation axis is referred to as "inclination in the positive direction", and rotation (inclination) in the counter-clockwise direction with the Z axis as a rotation axis is referred to as "inclination in the negative direction", inclination in the negative direction of the γ direction is correlated to upward movement of the end position, and inclination in the positive direction of the γ direction is correlated to downward movement of the end position.

Further, according to the movement direction data shown in FIG. 11, inclination in the γ direction with the mobile electronic device 10 held in the portrait state (the case shown in FIGS. 2, 5, 7) is correlated to left-right movement of the end position. Note here assuming that rotation (inclination) in the clockwise direction with the Z axis as a rotation axis is referred to as "inclination in the positive direction", and rotation (inclination) in the counter-clockwise direction with the Z axis as a rotation axis is referred to as "inclination in the negative direction", inclination in the negative direction of the γ direction (the arrow L in FIG. 5) is correlated to rightward movement of the end position, and inclination in the positive direction (the arrow R in FIG. 5) of the γ direction is correlated to leftward movement of the end position.

Further, according to the movement direction data shown in FIG. 11, inclination in the α direction with the mobile electronic device 10 held in the landscape state is correlated to left-right movement of the end position. Note here assuming that rotation (inclination) in the clockwise direction with the X axis as a rotation axis is referred to as "inclination in the positive direction", and rotation (inclination) in the counter-clockwise direction with the X axis as a rotation axis is referred to as "inclination in the negative direction", inclination in the negative direction of the α direction is correlated to rightward movement of the end position, and inclination in the positive direction of the α direction is correlated to leftward movement of the end position.

Note that a correlation relationship between the inclination direction of the mobile electronic device 10 and the movement direction of the end position is not limited to the example shown in FIG. 11. For example, inclination in the β direction may be correlated to left-right movement of the end position.

The end position moving unit 42B obtains a movement direction corresponding to the inclination direction of the mobile electronic device 10, based on the movement direction data shown in FIG. 11. Then, the end position moving unit 42B moves the end position in the movement direction.

Further, for example, the end position moving unit 42B sets a moving speed of the end position, based on the inclination degree (the extent) of the mobile electronic device 10 detected by the inclination detection unit 38.

For example, the end position moving unit 42B moves the end position by every number of letters corresponding to the inclination degree of the mobile electronic device 10 detected by the inclination detection unit 38. That is, the end position moving unit 42B moves the end position by a given number of letters at a predetermined time interval, and the end position moving unit 42B changes the "number of letters" mentioned above, based on the inclination degree of the mobile electronic device 10. In the above described manner, the end position moving unit 42B changes the moving speed of the end position, based on the inclination degree of the mobile electronic device 10.

Alternatively, the end position moving unit 42B may move the end position by a predetermined number of letters at a time interval corresponding to the inclination degree of the mobile electronic device 10. That is, the end position moving unit 42B moves the end position by a predetermined number of letters (for example, one letter) at a given time interval, and the end position moving unit 42B may change the "time interval" mentioned above, based on the inclination degree of the mobile electronic device 10. In the above described manner, the end position moving unit 42B may change the moving speed of the end position, based on the inclination degree of the mobile electronic device 10.

In order to set the moving speed of the end position, based on the inclination degree of the mobile electronic device 10, information on a correlation relationship between the inclination degree of the mobile electronic device 10 and the moving speed of the end position is necessary. Below, data indicating the correlation relationship will be referred to as "moving speed data".

FIG. 12 shows one example of the moving speed data. According to the moving speed data shown in FIG. 12, an inclination degree of the mobile electronic device 10 is correlated to moving speed information of the end position. The moving speed data is set such that a larger inclination degree of the mobile electronic device 10 leads to a faster moving speed of the end position.

Note that "θ" in FIG. 12 indicates a degree by which the current posture of the mobile electronic device 10 is inclined relative to the reference posture, that is, a degree of inclination of the mobile electronic device 10 relative to the reference posture.

Further, the "moving speed information" in FIG. 12 is set as described below. For example, in an arrangement in which the end position is moved by a given number of letters at a predetermined time interval, information indicating the "number of letters" mentioned above is set as the "moving speed information". In this case, it is set such that a larger inclination degree of the mobile electronic device 10 leads to a larger "number of letters" mentioned above. Further, for example, in an arrangement in which the end position is moved by a predetermined number of letters at a given time interval, information indicating the "time interval" mentioned above is set as the "moving speed information". In this case, it is set such that a larger inclination degree of the mobile electronic device 10 leads to a shorter "time interval" mentioned above.

Further, when the user inclines the mobile electronic device 10 and instantly returns to its original state, the end position moving unit 42B moves the end position of the selection range 20 by one letter in the direction corresponding to the inclination direction of the mobile electronic device 10.

That is, when the inclination state of the mobile electronic device 10 detected by the inclination detection unit 38 is changed from the first state (reference posture) to the second state and then returned from the second state to a state in which the difference from the first state is within a predetermined range, the end position moving unit 42B determines whether or not the period of time taken after the inclination state of the mobile electronic device 10 starts changing from the first state to the second state until the inclination state returns to the state in which the difference from the first state is within the predetermined range is within a reference period of time. In the case where it is determined that the period of time taken is within the reference period of time, the end position moving unit 42B moves the end position by one letter in the direction corresponding to the inclination direction of the mobile electronic device 10 in the second state.

Note that a user can hardly keep holding the mobile electronic device 10 in the same posture, and therefore, the inclination of the mobile electronic device 10 may be slightly changed without a user's intention of inclining the mobile electronic device 10. It is not preferable that the end position is moved in such a case. In view of the above, in order to ensure that the end position is moved by one letter only when a user intends to make fine adjustment of the end position, the "second state" is limited to a state in which the difference from the first state is relatively large. For example, the "second state" is a state in which the degree of inclination of the mobile electronic device 10 in the second state relative to the mobile electronic device 10 in the first state is larger than a reference value.

Further, the "state in which the difference from the first state is within the predetermined range" is a state that can be considered as the first state. It is difficult for a user to change the inclination state of the mobile electronic device 10 from the first state to the second state and then return to a state exactly the same as the first state. Therefore, in the mobile electronic device 10, in a case in which the inclination state of the mobile electronic device 10 is changed from the first state to the second state and then returned to the "state in which the difference from the first state is within the predetermined range", it is considered that the inclination state of the mobile electronic device 10 has returned to the first state.

Further, the "reference period of time" is a period of time that is set to determine whether or not the period of time taken after the inclination state of the mobile electronic device 10 starts changing from the first state to the second state until the inclination state of the mobile electronic device 10 returns to the state in which the difference from the first state is within the predetermined range is short. Therefore, the "reference period of time" is set to a relatively short period of time (for example, 0.5 second).

Note that the "direction corresponding to the inclination direction of the mobile electronic device 10 in the second state" refers to the direction of inclination of the mobile electronic device 10 in the second state relative to the mobile electronic device 10 in the first state. That is, the "direction corresponding to the inclination direction of the mobile electronic device 10 in the second state" refers to in which direction the mobile electronic device 10 in the second direction is inclined relative to the mobile electronic device 10 in the first state. A movement direction corresponding to the inclination direction of the mobile electronic device 10 in the second state is obtained based on the movement direction data (FIG. 11).

When touch on the touch panel by the user is released, the selection range setting unit 42 confirms the area from the start position set by the start position setting unit 42A to the end position at the point of time when the touch on the touch panel by the user is released as the selection range.

Below, the processing execution unit 44 will be described. When at least a part of a character string is set as the selection range, the processing execution unit 44 executes processing relevant to at least the part of the character string.

The "processing relevant to at least a part of a character string" is, for example, processing for differentiating at least a part of a character string, and specifically processing of displaying at least apart of a character string in a display manner (for example, letter color and/or background color, or the like) different from that for the other parts. Further, for example, the "processing relevant to at least apart of a character string" refers to processing of copying, cutting, or deleting at least a part of a character string. That is, the "processing relevant to at least a part of a character string" refers to, for example, processing of storing at least a part of a character string in a clip board (the main memory unit 12). Alternatively, the "processing relevant to at least a part of a character string" refers to, for example, processing of storing at least a part of a character string in the clip board (the main memory unit 12) and further deleting from the screen. Still alternatively, the "processing relevant to at least a part of a character string" refers to, for example, processing of deleting at least a part of a character string from the screen.

Figure 13:
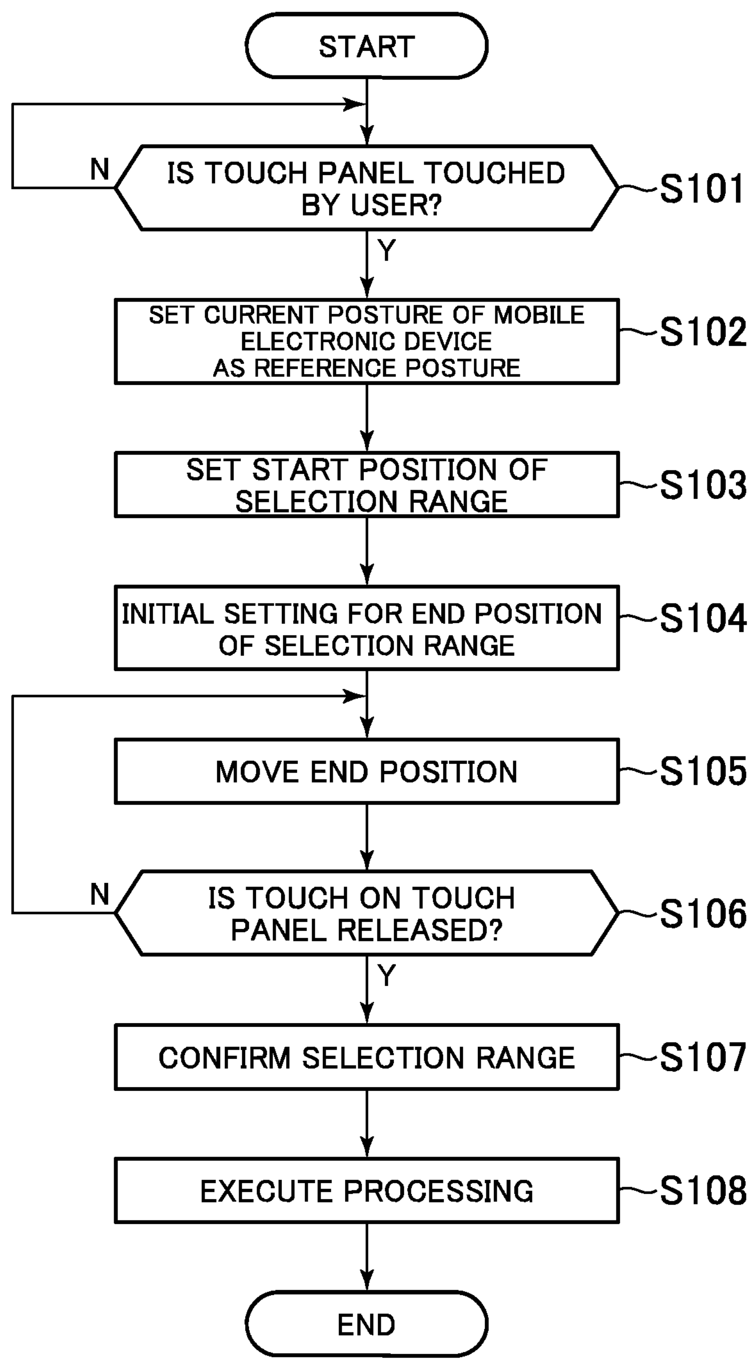
FIG. 13 is a flowchart showing one example of processing executed in an information processing device.

Below, processing that is executed in the mobile electronic device 10 in order to implement the above described function blocks will be described. FIG. 13 is a flowchart showing one example of processing that is executed in the mobile electronic device 10 when a screen such as is shown in FIG. 3 is displayed. The control unit 11 executes the processing shown in FIG. 13 according to a program, thereby functioning as the designated position information obtaining unit 36, the inclination information obtaining unit 40, the selection range setting unit 42, and the processing execution unit 44.

As shown in FIG. 13, initially, the control unit 11 determines whether or not the touch panel is touched by the user (S101). When it is not determined that the touch panel is touched by the user, the control unit 11 keeps monitoring whether or not the touch panel is touched by the user. Meanwhile, when it is determined that the touch panel is touched by the user, the control unit 11 sets the current posture of the mobile electronic device 10 as a reference posture (S102).

Further, the control unit 11 sets the start position of the selection range 20 (S103). That is, the control unit 11 (the designated position information obtaining unit 36) obtains the designated position information supplied from the touch panel. Then, the control unit 11 (the start position setting unit 42A) sets a letter displayed closest to the user's designated position (touched position) as the start position of the selection range 20.

Further, the control unit 11 makes initial setting for the end position of the selection range 20 (S104). For example, the control unit 11 sets a letter immediately subsequent to the letter set as the start position at step S103 as the end position in initial setting.

Further, the control unit 11 (the end position moving unit 42B) moves the end position of the selection range 20 (S105).

For example, the control unit 11 determines whether or not the posture of the mobile electronic device 10 has been changed from the reference posture. That is, the control unit 11 determines whether or not the mobile electronic device 10 has been inclined from the reference posture. Note that, for example, based on a result of detection by a gyro sensor, the control unit 11 determines in which direction and by what degree the current posture of the mobile electronic device 10 is inclined relative to the reference posture. As a method for determining in which direction and by what degree the current posture of the mobile electronic device 10 is inclined relative to the reference posture, based on a result of determination by a gyro sensor, a publicly known method may be used.

The control unit 11 determines that the posture of the mobile electronic device 10 has been changed from the reference posture only when the degree of inclination relative to the reference posture is larger than a reference value (hereinafter referred to as "a first reference value"). That is, the control unit 11 determines that the posture of the mobile electronic device 10 is not changed from the reference posture when the inclination degree relative to the reference posture is not larger than the first reference value. It is difficult for the user to keep holding the mobile electronic device 10 in the same posture, and therefore, the posture of the mobile electronic device 10 may change even when the user does not intend to incline the mobile electronic device 10. In view of the above, determination as to whether or not the posture of the mobile electronic device 10 has been changed from the reference posture is made in the above described manner in order to ensure that the determination that the posture of the mobile electronic device 10 has been changed from the reference posture is made only when the user intentionally inclines the mobile electronic device 10 (in other words, intentionally moves the end posture).

Figure 14:
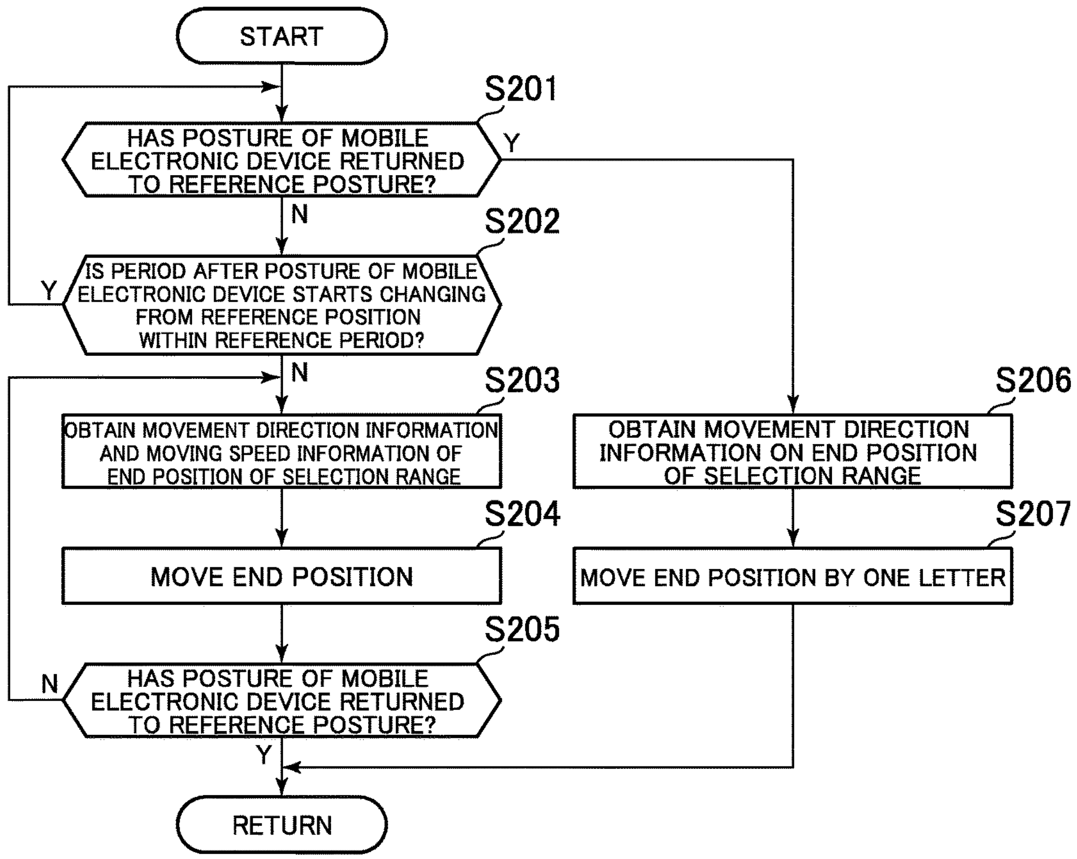
FIG. 14 is a flowchart showing one example of processing executed in an information processing device.

When it is determined that the posture of the mobile electronic device 10 has been changed from the reference posture, the control unit 11 executes processing such as is shown in FIG. 14, for example, as processing for moving the end position of the selection range 20.

That is, initially, the control unit 11 determines whether or not the posture of the mobile electronic device 10 has returned to the reference posture (S201).

For example, in the mobile electronic device 10, a result of detection by the gyro sensor is obtained for every predetermined period of time and stored in the main memory unit 12 (or the auxiliary storage unit 13). Then, the control unit 11 integrates an angular speed as to every axis, to thereby determine by what degree the current posture of the mobile electronic device 10 is inclined relative to the reference posture in the respective directions (the α direction, the β direction, and the γ direction).

Note that when the posture of the mobile electronic device 10 has currently returned to a posture having a difference within a predetermined range from the reference posture, the control unit 11 considers that the posture of the mobile electronic device 10 has returned to the reference posture. In other words, when the posture of the mobile electronic device 10 has currently returned to a posture having a difference in inclination equal to or smaller than a reference value (hereinafter referred to as a "second reference value") from the reference posture, the control unit 11 considers that the posture of the mobile electronic device 10 has returned to the reference posture. The determination is made in this manner as it is difficult for the user to return the mobile electronic device 10 to a posture exactly the same as the reference posture. Note that the second reference value in this case is set to a value smaller than the first reference value mentioned above.

When it is not determined at step S201 that the posture of the mobile electronic device 10 has returned to the reference posture, the control unit 11 determines whether or not the period of time elapsed after the determination is made that the posture of the mobile electronic device 10 is changed from the reference posture is within a reference period of time (for example, 0.5 second) (S202). When it is determined that the above mentioned period of time elapsed is within the reference period of time, the control unit 11 executes again the processing at step S201.

Meanwhile, a case with determination at step S201 that the posture of the mobile electronic device 10 has returned to the reference posture refers to a case in which the user inclines the mobile electronic device 10 for a relatively short period of time (for example, within 0.5 second).

In this case, the control unit 11 obtains the movement direction information on the end position of the selection range (S206). For example, the control unit 11 determines by what degree the posture of the mobile electronic device 10 is inclined relative to the reference posture in the respective directions (the α direction, the β direction, and the γ direction) at a point of time when the inclination relative to the reference posture is largest. Then, the control unit 11 obtains the movement direction information on the end position correlated to the result of determination, based on the holding state data (FIG. 10) and the movement direction data (FIG. 11). Thereafter, the control unit 11 moves the end position of the selection range 20 by one letter in the direction indicated by the movement direction information obtained at step S206 (S207). In this case, the processing shown in FIG. 14 is ended.

Meanwhile, a case without determination at step S202 that the elapsed period of time is within the reference period of time (for example, 0.5 second) refers to a case in which the user keeps holding the mobile electronic device 10 inclined for a relatively long period of time (for example, longer than 0.5 second).

In this case, the control unit 11 obtains the movement direction information and the moving speed information on the end position of the selection range 20 (S203). For example, the control unit 11 determines by what degree the current posture of the mobile electronic device 10 is inclined in the respective directions (the α direction, the β direction, and the γ direction) relative to the reference posture. Then, the control unit 11 obtains the movement direction information on the end position correlated to the result of determination, based on the holding state data (FIG. 10) and the movement direction data (FIG. 11). Further, the control unit 11 obtains the moving speed information on the end position correlated to the result of determination, based on the holding state data (FIG. 10) and the moving speed data (FIG. 12). Thereafter, the control unit 11 moves the end position of the selection range 20, based on the movement direction information and the moving speed information obtained at step S203 (S204). That is, the control unit 11 moves the end position of the selection range 20 in the direction indicated by the movement direction information obtained at step S203 at the moving speed indicated by the moving speed information obtained at step S203.

The control unit 11 repetitively executes the processing at steps S203 and S204 until the posture of the mobile electronic device 10 returns to the reference posture. That is, after execution of the processing at step S204, the control unit 11 determines whether or not the posture of the mobile electronic device 10 has returned to the reference posture (S205). The processing at step S205 is similar to that at step S201. When it is determined that the posture of the mobile electronic device 10 has not returned to the reference posture, the control unit 11 executes again the processing at step S203. Meanwhile, when it is determined that the posture of the mobile electronic device 10 has returned to the reference posture, the processing shown in FIG. 14 is ended.

Note that the processing for moving the end position of the selection range 20 is not limited to the processing shown in FIG. 14. For example, in the processing shown in FIG. 14, the processing at step S203 to S205 is executed after waiting for the period of time elapsed after the posture of the mobile electronic device 10 starts changing from the reference posture to become longer than the reference period of time (for example, 0.5 second). However, the processing at steps S203 to S205 may be executed immediately after the posture of the mobile electronic device 10 is changed from the reference posture. That is, the processing at steps S201 and S202 may be omitted.

In this case, when it is determined at step S205 that the posture of the mobile electronic device 10 has returned to the reference posture, the control unit 11 determines whether or not the period of time taken after the posture of the mobile electronic device 10 starts changing from the reference posture until the posture returns to the reference posture is within the reference period of time (for example, 0.5 second). When it is determined that the above described period of time is within the reference period of time, the control unit 11 resets the movement of the end position that is made in the processing at steps S203 to S205. That is, the control unit 11 returns the end position of the selection range 20 to the end position at a point of time when the posture of the mobile electronic device 10 starts changing from the reference posture. Thereafter, the control unit 11 executes processing similar to that at steps S206 and S207 to thereby move the end position of the selection range 20 by one letter in the direction corresponding to the inclination direction of the mobile electronic device 10.

In the above described manner as well, it is possible to execute movement control of the end position of the selection range 20, similar to the processing shown in FIG. 14.

As shown in FIG. 13, after execution of the processing at step S105, the control unit 11 determines whether or not touch on the touch panel by the user has been released, based on the designated position information supplied from the touch panel (S106). When the designated position information is changed from "indicating a user's designated position" to "not indicating a user's designated position (indicating absence of detection of a user's designated position)", the control unit 11 determines that touch on the touch panel has been released.

When it is not determined that touch on the touch has been released, the control unit 11 continues the processing at steps S105 and S106. Meanwhile, when it is determined that touch on the touch has been released, the control unit 11 executes processing at step S107 to be described later. Note that, although not shown in FIG. 14, in actuality, monitoring whether or not touch on the touch panel has been released is continued while the processing shown in FIG. 14 is executed as well. When touch on the touch panel is released while the processing shown in FIG. 14 is being executed, the control unit 11 stops execution of the processing shown in FIG. 14, and executes the processing at step S107 to be described later.

When it is not determined that touch on the touch has been released, the control unit 11 (the selection range setting unit 42) confirms the area from the start position set at step S103 to the end position at the point of time when touch on the touch panel is released as the selection range 20 (S107).

Thereafter, the control unit 11 (the processing execution unit 44) executes processing relevant to the character string portion set as the selection range 20 (S108). For example, the control unit 11 displays a menu in the screen for requesting the user to select any of a plurality of kinds of processing (for example, copy, cut, delete, or the like). Then, the control unit 11 executes the processing selected by the user with respect to the character string portion set as the selection range 20. For example, when "copy" is selected, the control unit 11 stores the character string portion set as the selection range 20 in a clip board (the main memory unit 12). For example, when "cut" is selected, the control unit 11 stores the character string portion set as the selection range 20 in the clip board (the main memory unit 12) and further deletes from the screen. For example, when "delete" is selected, the control unit 11 deletes the character string portion set as the selection range 20 from the screen.

In a case where processing to be executed is determined in advance, the control unit 11 may execute the processing relevant to the character string portion set as the selection range 20 without showing the menu described above. For example, when "cut" is determined in advance as processing to be executed, the control unit 11 stores the character string portion set as the selection range 20 in the clip board (the main memory unit 12) and deletes from the screen without showing the menu described above. With the above, the description on the processing shown in FIG. 13 is completed.

In the above described mobile electronic device 10, the user can designate the end position of the selection range 20 by inclining the mobile electronic device 10. Meanwhile, in an arrangement in which the user designates the end position of the selection range 20 by touching the touch panel with a finger, the user may not be able to readily recognize which letter is designated as the end position as the letter is hidden by the finger. On the contrary, according to the mobile electronic device 10, such an inconvenience will not be caused, and the user can readily designate the end position of the selection range 20.

Further, in the mobile electronic device 10, the user can designate the moving speed of the end position of the selection range 20 by adjusting the inclination degree (an extent) of the mobile electronic device 10. In the mobile electronic device 10, according to such configuration, the user can designate the end position of the selection range 20.

Still further, in the mobile electronic device 10, the user can make fine adjustment of the end position of the selection range 20 by inclining the mobile electronic device 10 for only a relatively short period of time (for example, within 0.5 second). In the mobile electronic device 10, according to such configuration, the user can designate the end position of the selection range 20.

In the case where the mobile electronic device 10 is a mobile electronic device in a relatively small size, such as a smart phone, the user can designate the start position of the selection range 20 by touching the touch panel with a finger (for example, a thumb) of the hand holding the mobile electronic device 10, and then designate the end position of the selection range 20 by inclining the mobile electronic device 10. That is, the user can designate the selection range 20, using only the hand holding the mobile electronic device 10.

For example, when the user is standing in a train or the like, the user needs to use the mobile electronic device 10 while hanging on a strap with one hand and holding the mobile electronic device 10 with the other hand. According to the mobile electronic device 10, as the user can designate the selection range 20 using only the hand holding the mobile electronic device 10, the user can readily designate the selection range 20 even in a case described above.

Note here that as an operation for designating as a selection range at least a part of a character string displayed on a screen of a mobile electronic device having a touch panel, an operation such as one of "touching a touch panel with a finger to thereby designate the start position of the selection range and then sliding the finger to a desired position to thereby designate the end position of the selection range" may be employed.

When the above described operation is employed, however, it may be difficult to designate the selection range using only the hand holding the mobile electronic device. This is because, depending on a positional relationship between a position (first position) which the user wishes to designate as the start position of the selection range and a position (second position) which the user wishes to designate as the end position of the selection range, it may be difficult to slide a finger (for example, a thumb) of the hand holding the mobile electronic device from the first position to the second position.

On the contrary, according to the mobile electronic device 10 according to this embodiment, the user can readily designate the selection range using only the hand holding the mobile electronic device, whatever the positional relationship between a position (first position) which the user wishes to designate as the start position of the selection range and a position (second position) which the user wishes to designate as the end position of the selection range is.

Further, as an operation for designating as a selection range at least a part of a character string displayed on a screen of a mobile electronic device having a touch panel, an operation such as one of "touching the touch panel with a finger to thereby point out the start position of the selection range and then touching the touch panel with another finger to thereby point out the end position of the selection range" may be employed.

When the above described operation is employed, however, it may be difficult to designate a selection range using only the hand holding the mobile electronic device. This is because, depending on a positional relationship between a position (first position) which the user wishes to designate as the start position of the selection range and a position (second position) which the user wishes to designate as the end position of the selection range, it may be difficult to point out the first position with one finger (for example, a thumb) of the hand holding the mobile electronic device and the second position with another finger (for example, an index finger, a middle finger, a ring finger, or a little finger).

On the contrary, according to the mobile electronic device 10 according to this embodiment, the user can readily designate the selection range using only the hand holding the mobile electronic device, whatever the positional relationship between a position which the user wishes to designate as the start position of the selection range and a position which the user wishes to designate as the end position of the selection range is.

Note that the present invention is not limited to the above described embodiment.

[1] For example, at step S206, the control unit 11 (the end position moving unit 42B) may obtain the movement amount information on the end position of the selection range 20 together with the movement direction information on the end position.

In this case, the control unit 11 determines by what degree the posture of the mobile electronic device 10 is inclined in the respective directions (the α direction, the β direction, and the γ direction) at a point of time when the inclination relative to the reference posture is largest. Then, the control unit 11 obtains the movement direction information on the end position correlated to the result of determination, based on the holding state data (FIG. 10) and the movement direction data (FIG. 11).

Further, the control unit 11 obtains the movement amount information on the end position correlated to the result of determination, based on the holding state data (FIG. 10) and the movement speed data (FIG. 12). In this case, the "moving speed information" in the moving speed data shown in FIG. 12 is information indicating an amount by which to move the end position. That is, the "moving speed information" is information indicating by how many letters the end position is to be moved.

At step S207, the control unit 11 (the end position moving unit 42B) moves the end position of the selection range 20 in the direction indicated by the movement direction information obtained at step S206 by the movement amount (the number of letters) indicated by the movement amount information obtained at step S206.

[2] Further, for example, when the user touches the touch panel with a finger to designate the start position of the selection range 20, the control unit 11 may display an image for selection of any of a plurality of kinds of processing in the screen.

Figure 15:
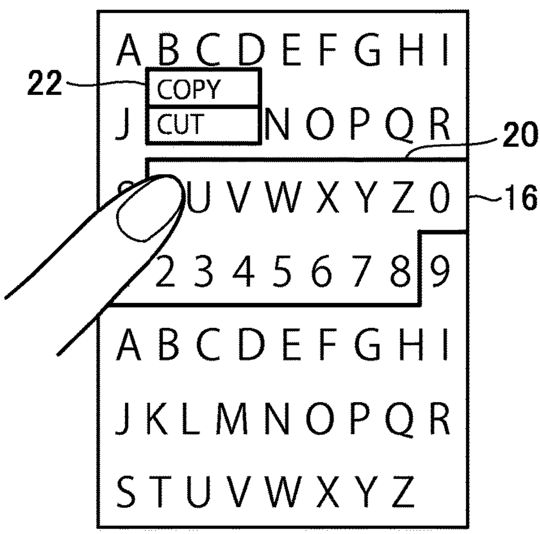
FIG. 15 shows another example of a screen displayed on the display unit.

FIG. 15 shows one example of a screen in this case. In the example shown in FIG. 15, a menu 22 for selecting either "copy" or "cut" is displayed in the screen. A position at which to display the menu 22 is set, based on the position designated by the user (touched position). That is, the menu 22 is displayed in the vicinity of the position designated by the user (the start position of the selection range 20).

Having moved the end position of the selection range 20 to a desired position, the user slides the finger touching the touch panel (that is, the finger touching the touch panel to designate the start position of the selection range 20) on the touch panel to a region in the menu 22 where desired processing is displayed. Thereafter, the user removes the finger from the touch panel.

When touch on the touch panel is released, the control unit 11 determines whether or not the position designated by the user (touched position) immediately before the touch on the touch panel is released is included in any of the plurality of determination regions set so as to be correlated to the plurality of respective kinds of processing shown in the menu 22. When the position designated by the user (touched position) immediately before the touch on the touch panel is released is included in any of the determination regions, the control unit 11 executes processing correlated to that determination region. For example, when the position designated by the user (touched position) immediately before the touch on the touch panel is released is included a determination region correlated to "cut", the control unit 11 stores the character string portion set as the selection range 20 in the clip board (the main memory unit 12) and further deletes from the screen.

In the above described manner, the user can readily select content of processing relevant to the character string portion set as the selection range 20.

[3] Although a case has been described in the above in which the posture (inclination) of the mobile electronic device 10 is determined based mainly on a result of detection by the gyro sensor, the posture (inclination) of the mobile electronic device 10 may be determined based on a result of detection by the acceleration sensor. In this case, as a method for determining the posture of the mobile electronic device 10 based on a result of detection by the acceleration sensor, a publicly known method may be used. Note that, when the user is in a vehicle, such as a train or the like, the acceleration sensor may be subjected to influence of acceleration or deceleration of the train or the like, which may deteriorate accuracy in determination of the posture (inclination) of the mobile electronic device 10. Regarding this point, use of the gyro sensor can avoid such influence.

[4] Further, in the screen displayed on the display unit 16, for example, text data may be shown for every predetermined number of pages (for example, one page). In this case, when the start position of the selection range 20 reaches the end of the page displayed on the screen, the following page may be displayed on the screen, and the end position may be shifted to the head of the following page.

[5] Further, the present invention can be applied to the mobile electronic device 10 in which, for example, data including text data and image data is displayed on the screen. For example, the present invention can be applied to the mobile electronic device 10 in which HTML data is displayed on the screen. That is, the present invention can be applied to a case in which the user can select at least a part of the text portion (a character string portion) of HTML data.

[6] Further, although an example of a case has been described in which an alphabet and a number are shown in the screen, referring to FIG. 3 or the like, the present invention can be applied to the mobile electronic device 10 in which a letter other than an alphabet and a number is shown in the screen. That is, the present invention can be applied to the mobile electronic device 10 in which hiragana, katakana, and Chinese character are shown in the screen. Further, the present invention can be applied to the mobile electronic device 10 in which a letter of a language other than Japanese (for example, simplified Chinese character, traditional Chinese character, or Hangul character) is shown in the screen.

The invention claimed is:

1. A mobile electronic device, comprising:

a display unit that displays a screen including a character string;

a designated position detection unit that detects a position in the screen designated by a user;

an inclination detection unit that detects an inclination of the mobile electronic device; and a selection range setting unit that sets at least a part of the character string as a selection range, wherein the selection range setting units comprises:

a start position setting unit that sets a start position of the selection range, based on the position designated by the user and detected by the designated position detection unit, and an end position moving unit that moves an end position of the selection range, based on a result of detection by the inclination detection unit, after the start position of the selection range is set, the end position moving unit sets a moving speed of the end position, based on a degree of the inclination of the mobile electronic device detected by the inclination detection unit.

2. The mobile electronic device according to claim 1, wherein the end position moving unit moves the end position in a direction corresponding to a direction of the inclination of the mobile electronic device detected by the inclination detection unit.

3. The mobile electronic device according to claim 1, wherein the end position moving unit moves the end position for every number of letters corresponding to the degree of the inclination of the mobile electronic device detected by the inclination detection unit.

4. The mobile electronic device according to claim 1, wherein the end position moving unit moves the end position by a predetermined number of letters at a time interval corresponding to the degree of the inclination of the mobile electronic device.

5. The mobile electronic device according to claim 1, wherein the end position moving unit comprises:

a determining unit that determines, in the case where a state of the inclination of the mobile electronic device detected by the inclination detection unit is changed from a first state to a second state, and then returned from the second state to a state in which a difference from the first state is within a predetermined range, whether or not a period of time is within a reference period of time, the period of time being taken after the state of the inclination of the mobile electronic device starts changing from the first state to the second state until the state of the inclination returns to the state in which the difference from the first state is within the predetermined range, and a moving unit that moves, in the case where it is determined that the period of time is within the reference period of time, the end position by one letter in a direction corresponding to a direction of inclination of the mobile electronic device in the second state relative to the mobile electronic device in the first state.

6. The mobile electronic device according to claim 1, wherein the end position moving unit comprises:

a determining unit that determines, in the case where a state of the inclination of the mobile electronic device detected by the inclination detection unit is changed from a first state to a second state, and then returned from the second state to a state in which a difference from the first state is within a predetermined range, whether or not a period of time is within a reference period of time, the period of time being taken after the state of the inclination of the mobile electronic device starts changing from the first state to the second state until the state of the inclination returns to the state in which the difference from the first state is within the predetermined range, and a moving unit that moves, in the case where it is determined that the period of time is within the reference period of time, the end position by a number of letters corresponding to a degree of inclination of the mobile electronic device in the second state relative to the mobile electronic device in the first state, in a direction corresponding to a direction of inclination of the mobile electronic device in the second state relative to the mobile electronic device in the first state.

7. The mobile electronic device according to claim 1, wherein the designated position detection unit is a touch panel, the start position setting unit sets the start position, based on a position on the touch panel touched by the user, in the case where the touch panel is touched by the user, the end position setting unit keeps moving the end position based on the result of detection by the inclination detection unit, until the user ceases to touch the touch panel, and in the case where the user ceases to touch the touch panel, the selection range setting unit confirms as the selection range a range from the start position to the end position at a time at which the touch on the touch panel by the user is released.

8. The mobile electronic device according to claim 1, wherein the end position moving unit moves the end position when a state of the inclination of the mobile electronic device is changed from a reference state, and the end position moving unit determines the end position when the state of the inclination of the mobile electronic device is returned to the reference state.

9. The mobile electronic device according to claim 1, wherein the end position moving unit changes a manner to move the end position based on a period of time being taken after a state of the inclination of the mobile electronic device starts changing from a reference state until the state of the inclination returns to the reference state.

10. The mobile electronic device according to claim 2, wherein the end position moving unit comprises:

a determining unit that determines, in the case where a state of the inclination of the mobile electronic device detected by the inclination detection unit is changed from a first state to a second state, and then returned from the second state to a state in which a difference from the first state is within a predetermined range, whether or not a period of time is within a reference period of time, the period of time being taken after the state of the inclination of the mobile electronic device starts changing from the first state to the second state until the state of the inclination returns to the state in which the difference from the first state is within the predetermined range, and a moving unit that moves, in the case where it is determined that the period of time is within the reference period of time, the end position by one letter in a direction corresponding to a direction of inclination of the mobile electronic device in the second state relative to the mobile electronic device in the first state.

11. The mobile electronic device according to claim 2, wherein the end position moving unit comprises:

a determining unit that determines, in the case where a state of the inclination of the mobile electronic device detected by the inclination detection unit is changed from a first state to a second state, and then returned from the second state to a state in which a difference from the first state is within a predetermined range, whether or not a period of time is within a reference period of time, the period of time being taken after the state of the inclination of the mobile electronic device starts changing from the first state to the second state until the state of the inclination returns to the state in which the difference from the first state is within the predetermined range, and a moving unit that moves, in the case where it is determined that the period of time is within the reference period of time, the end position by a number of letters corresponding to a degree of inclination of the mobile electronic device in the second state relative to the mobile electronic device in the first state, in a direction corresponding to a direction of inclination of the mobile electronic device in the second state relative to the mobile electronic device in the first state.

12. The mobile electronic device according to claim 2, wherein the designated position detection unit is a touch panel, the start position setting unit sets the start position, based on a position on the touch panel touched by the user, in the case where the touch panel is touched by the user, the end position setting unit keeps moving the end position based on the result of detection by the inclination detection unit, until touch on the touch panel by the user is released, and in the case where the touch on the touch panel by the user is released, the selection range setting unit confirms as the selection range a range from the start position to the end position at a time at which the touch on the touch panel by the user is released.

13. A method for controlling a mobile electronic device including a display unit that displays a screen, a designated position detection unit that detects a position in the screen designated by a user, and an inclination detection unit that detects an inclination of the mobile electronic device, the method comprising:

displaying a screen including a character string on the display unit;

obtaining designated position information on the position designated by the user from the designated position detection unit;

obtaining inclination information on the inclination of the mobile electronic device from the inclination detection unit; and setting at least a part of the character string as a selection range, wherein the setting comprises:

setting a start position of the selection range, based on the designated position information, and moving an end position of the selection range, based on the inclination information, after the start position of the selection range is set;

wherein the moving of the end position includes setting a moving speed of the end position, based on a degree of the inclination of the mobile electronic device detected by the inclination detection unit.

* * * * *